(12) United States Patent
Imai (10) Patent No.: US 12,511,513 B2
(45) Date of Patent: Dec. 30, 2025

(54) STORAGE BOX STATE DETERMINATION SYSTEM

(71) Applicant: ISUZU MOTORS LIMITED, Tokyo (JP)

(72) Inventor: Akira Imai, Kanagawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 65 days.

(21) Appl. No.: 18/547,387

(22) PCT Filed: Mar. 18, 2022

(86) PCT No.: PCT/JP2022/012858
§ 371 (c)(1),
(2) Date: Aug. 22, 2023

(87) PCT Pub. No.: WO2022/202717
PCT Pub. Date: Sep. 29, 2022

(65) Prior Publication Data
US 2024/0135133 A1 Apr. 25, 2024
US 2024/0232566 A9 Jul. 11, 2024

(30) Foreign Application Priority Data
Mar. 22, 2021 (JP) .................. 2021-047392

(51) Int. Cl.
*G06K 19/077* (2006.01)
*B65D 25/20* (2006.01)

(52) U.S. Cl.
CPC ..... *G06K 19/07758* (2013.01); *B65D 25/205* (2013.01); *G06K 19/0772* (2013.01); *B65D 2203/10* (2013.01)

(58) Field of Classification Search
CPC .. G06K 19/00; G06K 19/077; G06K 19/0772; G06K 19/07758; G06Q 10/00;
(Continued)

(56) References Cited

U.S. PATENT DOCUMENTS

2008/0154683 A1* 6/2008 Kawada ................ G06Q 50/40
705/7.11
2017/0371286 A1* 12/2017 Takahashi ............ G03G 15/556
2021/0089055 A1* 3/2021 Tran ........................ G08G 5/74

FOREIGN PATENT DOCUMENTS

CN 103295109 A 9/2013
CN 102959268 A 6/2015
(Continued)

OTHER PUBLICATIONS

Patent Cooperation Treaty, International Search Report, Application No. PCT/JP2022/012858, dated May 31, 2022, in 4 pages.

*Primary Examiner* — Van T Trieu
(74) *Attorney, Agent, or Firm* — Procopio, Cory, Hargreaves & Savitch LLP (57) ABSTRACT

A storage box state determination system according to the present invention has: a storage unit that stores an identification information management table in which tag IDs of multiple wireless tags are associated with a storage box ID of a storage box, and a state management table in which an empty state and a storing state are associated with the number of tag IDs; an information acquisition unit that acquires the tag IDs using an antenna that receives radio waves of the wireless tags of the storage box 31; a number identification unit that identifies the number of acquired tag IDs which correspond to the storage box ID; and a state identification unit that identifies, on the basis of the number of acquisition, whether the state of the storage box as indicated by the storage box ID corresponding to the tag IDs is an empty state or a storing state.

8 Claims, 6 Drawing Sheets

(58) Field of Classification Search
CPC ...... G06Q 10/063; G06Q 10/08; G06Q 50/00;
G06Q 99/00; G08B 13/14; B65D 25/20
See application file for complete search history.

(56) References Cited

FOREIGN PATENT DOCUMENTS

| | | |
|---|---|---|
| CN | 109191042 A | 1/2019 |
| CN | 108140164 A | 6/2021 |
| JP | 2005-280745 A | 10/2005 |
| JP | 2007-055666 A | 3/2007 |
| JP | 2008-137794 A | 6/2008 |
| JP | 2009-035362 A | 2/2009 |
| JP | 2009-067465 A | 4/2009 |

\* cited by examiner

| STORAGE BOX ID | TAG ID | |
|---|---|---|
| CON1 | ABC | DEF |
| CON2 | GHI | JKL |
| ⋮ | ⋮ | ⋮ |

FIG. 6

| NUMBER OF ACQUISITION | STATE OF STORAGE BOX |
|---|---|
| 1 | EMPTY STATE |
| 2 | STORING STATE |

FIG. 7

| TAG ID |
|---|
| CON1ABC |
| CON1DEF |
| CON2GHI |

FIG. 8

STORAGE BOX STATE DETERMINATION SYSTEM

CROSS-REFERENCE TO RELATED APPLICATIONS

The present application is a U.S. National Stage entry of PCT Application number PCT/JP2022/012858, filed on Mar. 18, 2022, which claims priority under 35 U.S.C § 119 (a) to Japanese Patent Application No. 2021-47392, filed on Mar. 22, 2021, contents of which are incorporated herein by reference in their entirety.

TECHNICAL FIELD

The present disclosure relates to a storage box state identification system for identifying a state of a storage box.

BACKGROUND OF THE INVENTION

A method for managing loads on a vehicle is known. Patent document 1 discloses a technique for reading wireless tags attached to each of a plurality of loaded items in a cargo bed using an antenna installed in the cargo bed of a vehicle to grasp the loaded items.

PRIOR ART

Patent Document

Patent Document 1: Japanese Unexamined Patent Application Publication No. 2008-137794

BRIEF DESCRIPTION OF THE INVENTION

Problem to be Solved by the Invention

When a load is stored in a reusable storage box and loaded onto a cargo bed, the load stored in the storage box is taken out and then an empty storage box is loaded onto the cargo bed. According to the technique in Patent Document 1, it is possible to know that a storage box is loaded onto the cargo bed, but it is impossible to identify whether the storage box stores a load or the storage box is empty.

The present disclosure focuses on this point, and an object thereof is to identify whether a storage box is in a storing state or an empty state.

Means for Solving the Problem

An embodiment of the present disclosure provides a storage box state identification system that includes a storage that stores an identification information management table in which a plurality of pieces of tag identification information for identifying wireless tags are associated with storage box identification information for identifying a storage box for storing a load, and a state management table in which an empty state where no load is stored in the storage box and a storing state where a load is stored in the storage box are associated with the number of pieces of the tag identification information, an information acquisition part that acquires the tag identification information of the wireless tag via an antenna that receives a radio wave outputted from the wireless tag attached to the storage box in a cargo bed of a vehicle, a number identification part that identifies storage box identification information corresponding to the tag identification information acquired by the information acquisition part by referencing the identification information management table, and identifies the number of pieces of tag identification information acquired corresponding to the identified storage box identification information, and a state identification part that identifies, by referencing the state management table, whether a state of a storage box indicated by the storage box identification information corresponding to the acquired tag identification information is the empty state or the storing state on the basis of the number of acquisitions identified by the number identification part.

The storage may store the state management table in which the empty state is associated with a state where the number of acquisitions is one, and the storing state is associated with a state where the number of acquisitions is two, and the state identification part may reference the state management table, and may identify a state of the storage box indicated by the storage box identification information as the empty state if the number of acquisitions is one, and may identify a state of the storage box indicated by the storage box identification information as the storing state if the number of acquisitions is two.

The storage box is foldable and may include two of the wireless tags, and two radio wave shielding portions through which a radio wave does not pass, wherein the two radio wave shielding portions may be disposed at positions facing each other when the storage box is folded, and any one of the two wireless tags may be disposed at a position being sandwiched between the two radio wave shielding portions facing each other when the storage box is folded.

The storage box may have side walls which are folded such that an upper division thereof and a lower division thereof connected to each other overlap, a first radio wave shielding portion of the two radio wave shielding portions may be disposed to a bottom plate connected to the lower division of the storage box, a second radio wave shielding portion of the two radio wave shielding portions may be disposed at a position in the upper division facing the first radio wave shielding portion when the storage box is folded, and a first wireless tag of the two wireless tags may be disposed at a position in the lower division where the first wireless wave shielding portion and the second wireless wave shielding portion sandwich the entire first wireless tag when the storage box is folded. A second wireless tag of the two wireless tags may be disposed at a position in the lower division which is not sandwiched between the first wireless wave shielding portion and the second wireless wave shielding portion facing each other when the storage box is folded.

The storage box state identification system may further include a transmission controller that transmits the state of the storage box identified by the state identification part to a terminal corresponding to the vehicle.

The storage may store the storage box identification information, vehicle identification information for identifying a vehicle on which the storage box indicated by the storage box identification information is loaded, and a place where the storage box indicated by the storage box identification information is to be unloaded in association with each other, the information acquisition part may acquire a current position of the vehicle on which the storage box indicated by the storage box identification information is loaded, and the transmission controller may transmit, to the terminal, information indicating that the storage box in the storing state to be unloaded at the current position is in the cargo bed of the vehicle if the current position of the vehicle is included in the place to unload associated with storage box identification information of the storage box in the storing state.

If the states of all of the plurality of storage boxes are identified as the empty state, the transmission controller may transmit unloading completion information indicating that unloading is completed to the terminal.

Effect of the Invention

According to the present disclosure, it is possible to identify whether a storage box is in a storing state or an empty state.

DESCRIPTION OF EMBODIMENTS

Storage Box State Identification System S

Figure 1:
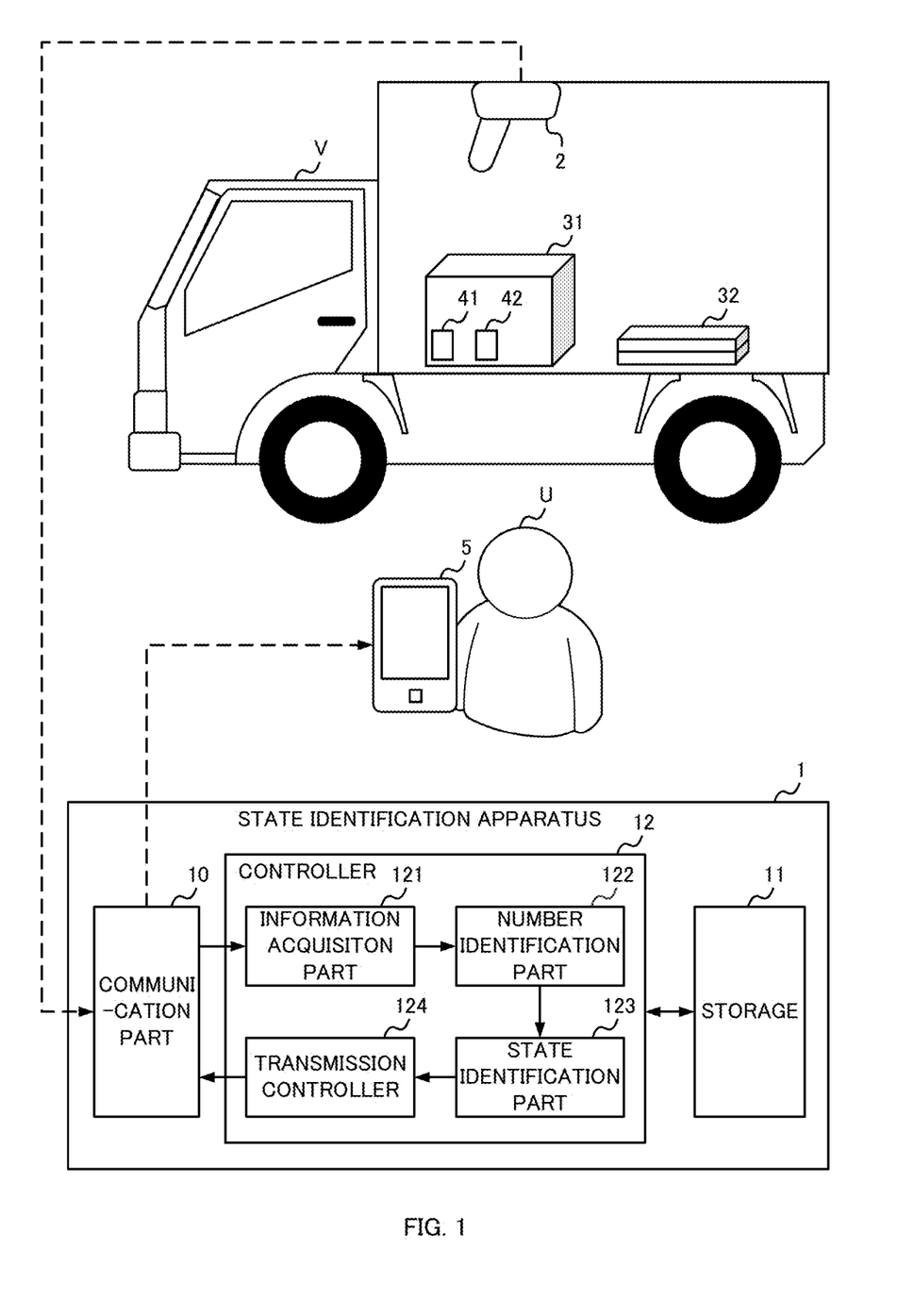
FIG. 1 schematically shows a configuration of a storage box state identification system.

FIG. 1 schematically shows a configuration of a storage box state identification system S. The storage box state identification system S includes a state identification apparatus 1, an antenna 2, and a terminal 5. The antenna 2 is installed in a cargo bed of a vehicle V. The vehicle V is a vehicle such as a truck or trailer for transporting a load.

A storage box 31 and a storage box 32 are loaded onto the cargo bed of the vehicle V. The storage box 31 and the storage box 32 are foldable storage boxes. The storage box 31 is assembled and is in a storing state for storing the load. The storage box 32 is folded and is in an empty state where no load is stored in it. The storage box 31 and the storage box 32 are referred to as storage boxes below if no particular distinction needs to be made between them. The storage box comprises a housing made of a radio wave permeable material through which radio waves pass. The radio wave permeable material is, for example, plastic or wood. Since the storage box 31 and the storage box 32 have identical configurations, the storage box 31 will be used as an example in the following.

Figure 2:
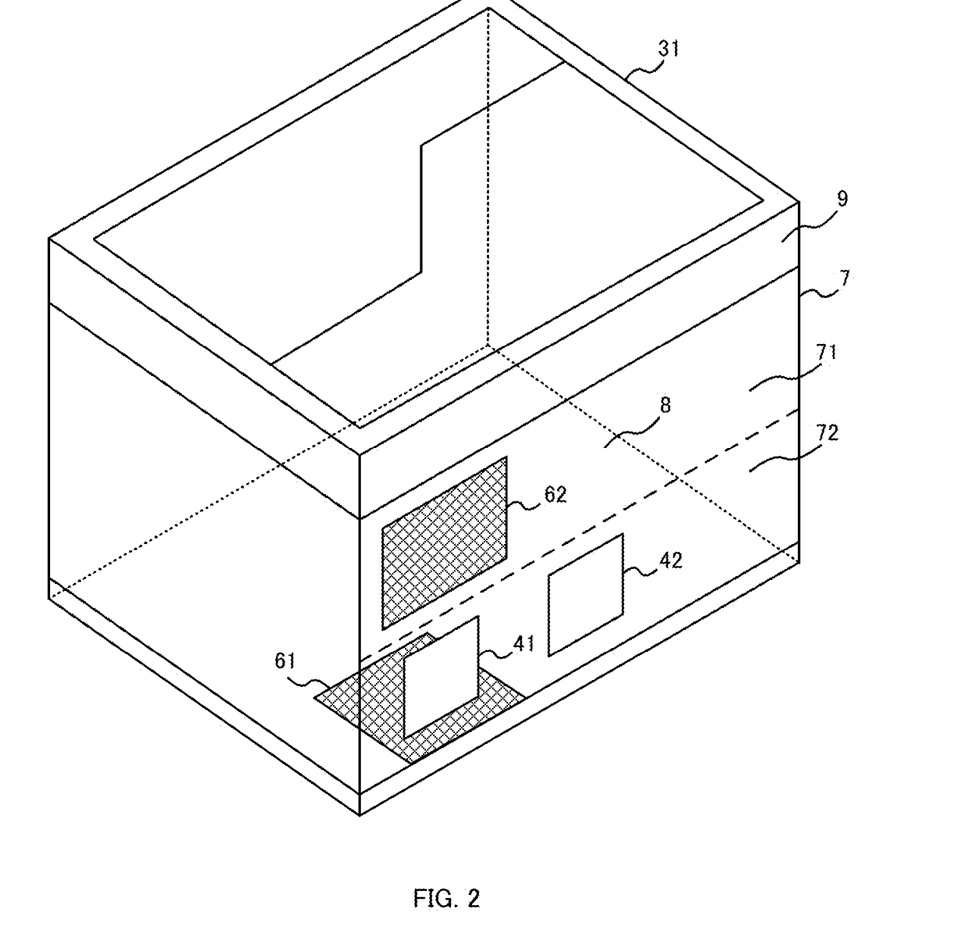
FIG. 2 is a perspective view of a storage box in a storing state.

A worker U delivering the loads assembles the storage box into a box shape and stores the loads in the assembled storage box. FIG. 2 is a perspective view of the storage box 31 in the storing state. A side wall 7 of the storage box 31 is divided into upper and lower divisions along a dashed line. The side wall 7 includes an upper division 71 and a lower division 72 connected to each other. When the storage box 31 is folded, the storage box 31 is folded such that the upper division 71 and the lower division 72 overlap each other.

Figure 3:
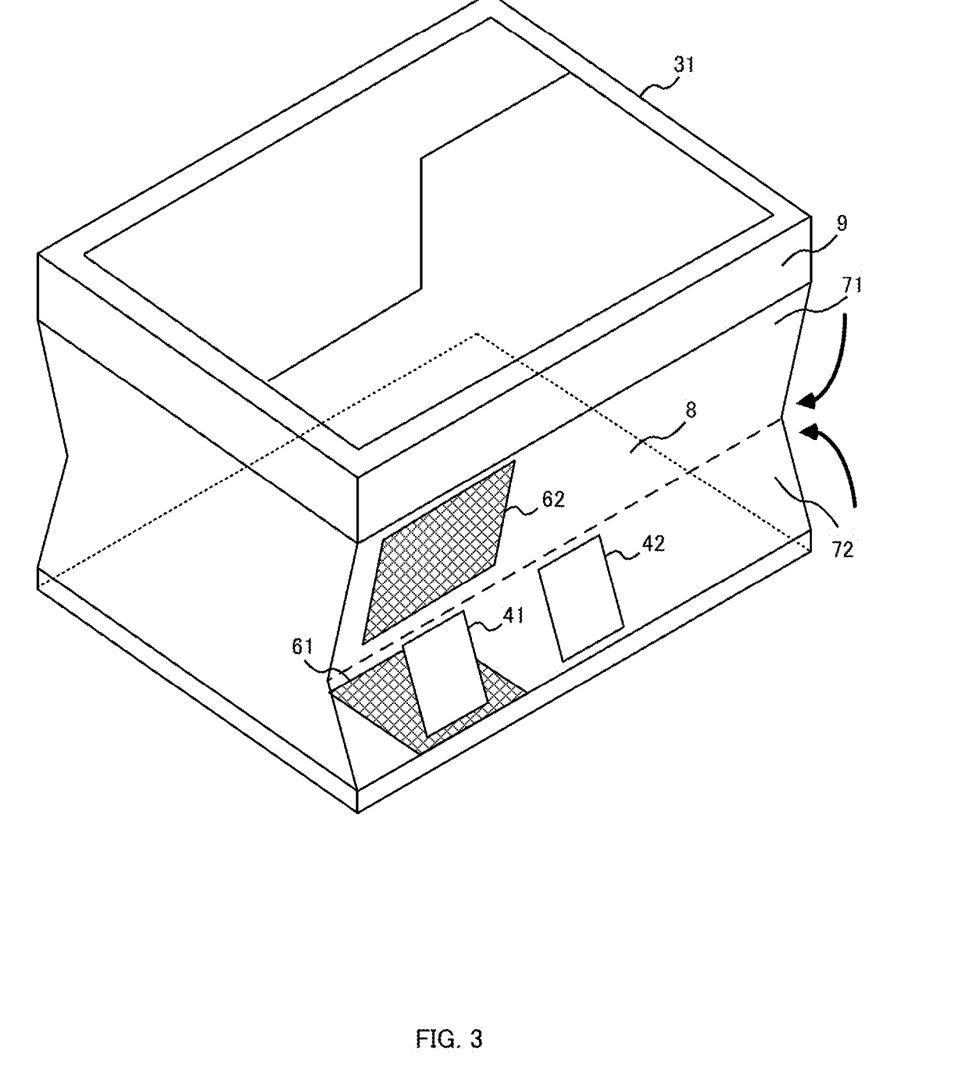
FIG. 3 is a perspective view of the storage box during folding.
Figure 4:
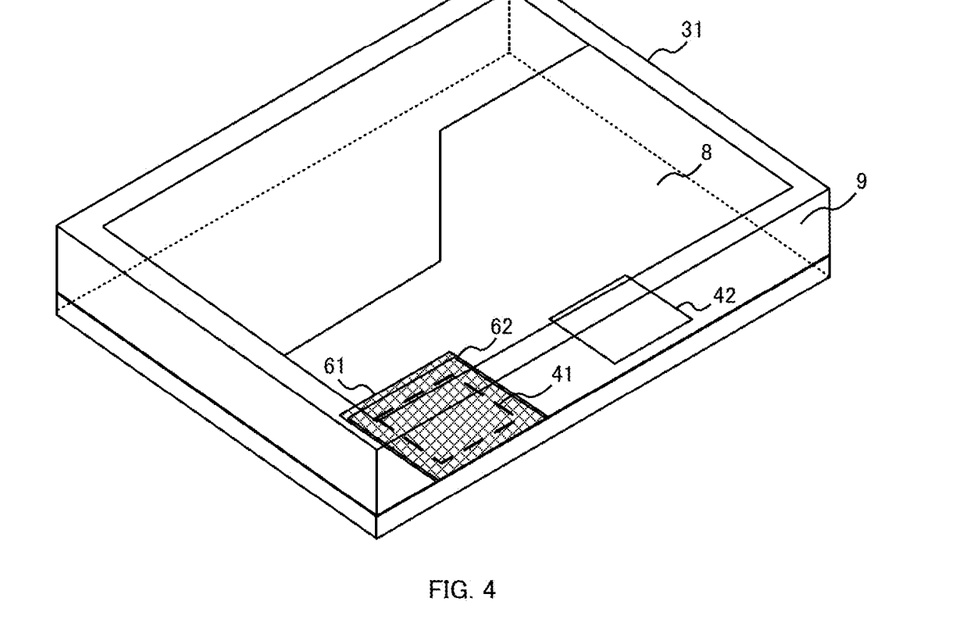
FIG. 4 is a perspective view of the storage box in an empty state.

After taking out the load from the storage box, the worker U folds the empty storage box. FIG. 3 is a perspective view of the storage box 31 during folding. The lower division 72 is connected to a bottom plate 8 of the storage box 31. The lower division 72 rotates around a connection between the lower division 72 and the bottom plate 8, and is folded towards the inside of the storage box 31. The upper division 71 is connected to an upper portion 9 of the storage box 31. The upper division 71 rotates around the connection between the upper division 71 and the upper portion 9, and is folded toward the inside of the storage box 31. FIG. 4 is a perspective view of the storage box 31 in the empty state.

The storage box 31 includes a first radio wave shielding portion 61 and a second radio wave shielding portion 62 through which the radio waves do not pass. The first radio wave shielding portion 61 and the second radio wave shielding portion 62 are made of a material through which the radio waves do not pass. The material through which the radio waves do not pass is a radio wave reflective material. Examples of the radio wave reflective material include metals and mirrors. Further, the radio wave shielding portion may also comprise a radio wave absorbing material as the material through which radio waves do not pass. The radio wave absorbing material is, for example, a material having a high moisture content.

The first radio wave shielding portion 61 is disposed to a surface of the bottom plate 8 of the storage box 31. The second radio wave shielding portion 62 is disposed to the upper division 71. The first radio wave shielding portion 61 and the second radio wave shielding portion 62 are disposed at positions facing each other when the storage box 31 is folded. Specifically, the second radio wave shielding portion 62 is disposed at a position in the upper division 71 facing the first radio wave shielding portion 61 when the storage box 31 is folded. As shown in FIG. 4, the first radio wave shielding portion 61 and the second radio wave shielding portion 62 are facing each other.

The storage box 31 includes a first wireless tag 41 and a second wireless tag 42. The first wireless tag 41 is disposed at a position being sandwiched between the first radio wave shielding portion 61 and second radio wave shielding portion 62 when the storage box 31 is folded. Specifically, the first wireless tag 41 is disposed at a position in the lower division 72 where the first radio wave shielding portion 61 and the second radio wave shielding portion 62 sandwich the entire first wireless tag 41 when the storage box 31 is folded. As shown in FIG. 4, the entire first wireless tag 41 is sandwiched between the first radio wave shielding portion 61 and the second radio wave shielding portion 62 facing each other.

On the other hand, the second wireless tag 42 is disposed at a position not being sandwiched between the first radio wave shielding portion 61 and the second radio wave shielding portion 62 facing each other when the storage box 31 is folded. The second wireless tag 42 is disposed, for example, next to the first wireless tag 41 in the lower division 72. Further, the second wireless tag 42 may be disposed to any of the upper division 71, a surface of the bottom plate 8, the upper portion 9, and other side walls, as long as the second wireless tag 42 is not sandwiched between the first radio wave shielding portion 61 and the second radio wave shielding portion 62 when the storage box 31 is folded.

The antenna 2 transmits a reading radio wave for reading the wireless tag attached to the storage box 31 and the storage box 32 in the cargo bed of the vehicle V. The wireless tag operates by using some of the reading radio wave transmitted from the antenna 2 as an energy source. When the wireless tag receives the reading radio wave, the wireless tag outputs a response radio wave containing information stored in the wireless tag. The information stored in the wireless tag is tag identification information for identifying the wireless tag. The tag identification information is referred to as a "tag ID" in the following.

Each of the first wireless tag 41 and the second wireless tag 42 can receive the reading radio wave if the storage box 31 is in the storing state. When the first wireless tag 41 and the second wireless tag 42 receive the reading radio wave, the first wireless tag 41 and the second wireless tag 42 transmit the response radio waves. As a result, the antenna 2 receives the response radio waves from the first wireless tag 41 and the second wireless tag 42 of the storage box 31 in the storing state.

When the storage box 31 is in the empty state, the first wireless tag 41 is sandwiched between the first radio wave shielding portion 61 and the second radio wave shielding portion 62. Therefore, if the storage box 31 is in the empty state, the first wireless tag 41 does not transmit the response radio wave because the first wireless tag 41 cannot receive the reading radio wave.

Even if the storage box 31 is in the empty state, the second wireless tag 42 is not sandwiched between the first radio wave shielding portion 61 and the second radio wave shielding portion 62. So, when the storage box 31 is in the empty state, the second wireless tag 42 can receive the reading radio wave, and therefore transmits the response radio wave. As a result, when the storage box 31 is in the empty state, the antenna 2 receives only the response radio wave outputted by the second wireless tag 42 that has received the reading radio wave.

The antenna 2 transmits information indicating the received response radio wave to the state identification apparatus 1. For example, if the storage box 31 is in the storing state (see FIG. 2), the antenna 2 transmits the information indicating the response radio waves received from each of the first wireless tag 41 and the second wireless tag 42, to the state identification apparatus 1. On the other hand, if the storage box 31 is in the empty state (see FIG. 4), the antenna 2 transmits only the information indicating the response radio wave transmitted by the second wireless tag 42 not being sandwiched between the first radio wave shielding section 61 and the second radio wave shielding section 62, to the state identification apparatus 1.

As described above, the antenna 2 receives a different number of response radio waves from the wireless tags attached to the storage box, depending on the state of the storage box. In the example of FIG. 1, the antenna 2 transmits, to the state identification apparatus 1, the information indicating the response radio waves received from i) the first wireless tag 41, ii) the second wireless tag 42 attached to the storage box 31 in the storing state and iii) the wireless tag not sandwiched by the radio wave shielding members among the two wireless tags attached to the storage box 32 in the empty state. Further, the antenna 2 may acquire the tag ID from the response radio wave and transmit the tag ID acquired to the state identification apparatus 1.

The state identification apparatus 1 acquires the tag ID from the antenna 2. Specifically, the state identification apparatus 1 acquires the tag ID from the information indicating the response radio wave received by the antenna 2. Further, if the antenna 2 transmits the tag ID, the state identification apparatus 1 may acquire the transmitted tag ID. Then, the state identification apparatus 1 identifies whether the state of the storage box in the cargo bed of the vehicle V is the storing state or the empty state on the basis of the number of tag IDs acquired. The details of processing for identifying the state of the storage box performed by the state identification apparatus 1 will be described below.

The state identification apparatus 1 includes a communication part 10, a storage 11, and a controller 12. The communication part 10 is a communication module for transmitting and receiving information via a communication line. For example, the communication part 10 can transmit and receive the information to and from the antenna 2 mounted on the vehicle V and the terminal 5 used by the worker U via the Internet.

The storage 11 is a storage medium including a Read Only Memory (ROM), a Random Access Memory (RAM), a hard disk, and the like. The storage 11 stores a program executed by the controller 12.

The storage 11 stores an identification information management table. The identification information management table is a data table in which a plurality of tag IDs for identifying the wireless tags attached to the storage box are associated with storage box identification information for identifying the storage box for storing the load. The storage box identification information is referred to as a "storage box ID" in the following.

Figure 5:
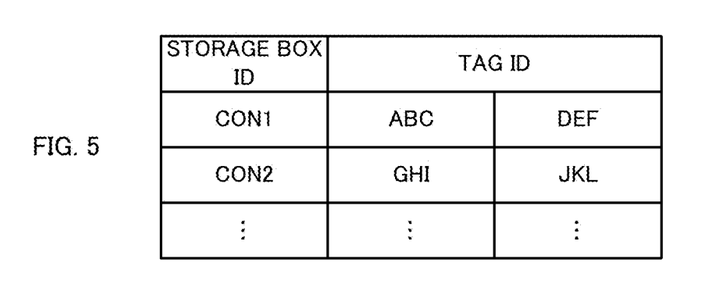
FIG. 5 shows an example of an identification information management table.

FIG. 5 shows an example of the identification information management table. As shown in FIG. 5, two tag IDs are associated with the storage box ID. For example, a tag ID [ABC] of the first wireless tag 41 attached to the storage box 31 and a tag ID [DEF] of the second wireless tag 42 are associated with a storage box ID [CON1] of the storage box 31. Further, tag IDs [GHI] and [JKL] of the wireless tags attached to the storage box 32 are associated with a storage box ID [CON2] of the storage box 32.

Figure 6:
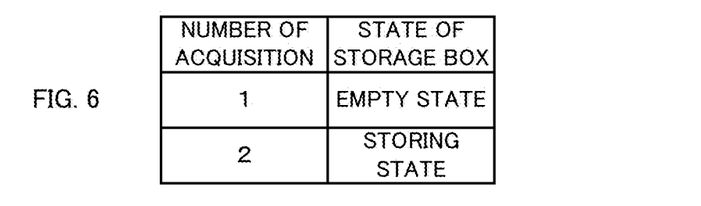
FIG. 6 shows an example of a state management table.

The storage 11 stores a state management table. The state management table is a data table in which the number of tag IDs acquired is associated with the empty state, where no load is stored in the storage box, and the storing state, where the load is stored in the storage box. FIG. 6 shows an example of the state management table. Specifically, the state management table in which the empty state is associated with a state where the number of tag IDs acquired is one, and the storing state is associated with a state where the number of tag IDs acquired is two.

The controller 12 is a calculation resource including a processor such as a Central Processing Unit (CPU). By executing the program stored in the storage 11, the controller 12 achieves functions as an information acquisition part 121, a number identification part 122, a state identification part 123, and a transmission controller 124.

The information acquisition part 121 acquires the tag ID of the wireless tag attached to the storage box in the cargo bed of the vehicle V. In the example of FIG. 1, the information acquisition part 121 acquires the tag IDs of the first wireless tag 41 and the second wireless tag 42 attached to the storage box 31 in the storing state. The information acquisition part 121 acquires the tag ID included in the information indicating the response radio wave via the communication part 10 and the antenna 2. The information acquisition part 121 may directly acquire the tag ID via the communication part 10 and the antenna 2.

The number identification part 122 identifies the storage box ID corresponding to the acquired tag ID by referring to the identification information management table. For example, if the tag ID [ABC] is acquired, the number identification part 122 identifies the storage box ID [CON1].

Subsequently, the number identification part 122 identifies the number of tag IDs acquired. Specifically, the number identification part 122 identifies the number of tag IDs acquired corresponding to the storage box ID. For example, if the tag ID [ABC] and the tag ID [DEF] corresponding to the storage box ID [CON1] are acquired, the number identification part 122 identifies that the number of acquisitions is two. Further, if only the tag ID [GHI] corresponding to the storage box ID [CON2] is acquired and the tag ID [JKL] is not acquired, the number identification part 122 identifies that the number of acquisitions is one.

The state identification part 123 references the state management table and identifies the state of the storage box on the basis of the identified number of acquisitions. Specifically, the state identification part 123 identifies whether the state of the storage box indicated by the storage box ID corresponding to the acquired tag ID is the empty state or the storing state, on the basis of the number of tag IDs acquired. More specifically, if the number of tag IDs acquired is one, the state identification part 123 identifies that the state of the storage box indicated by the storage box ID is the empty state. Further, if the number of tag IDs acquired is two, the state identification part 123 identifies that the state of the storage box indicated by the storage box ID is the storing state.

As a specific example, if the number of acquisitions corresponding to the storage box ID [CON1] is two, the state identification part 123 identifies that the storage box 31 identified by the storage box ID [CON1] is in the [storing state]. Further, if the number of acquisitions corresponding to the storage box ID [CON2] is one, the state identification part 123 identifies that the storage box 32 identified by the storage box ID [CON2] is in the [empty state].

The transmission controller 124 transmits the identified states of the storage box 31 and storage box 32 to a terminal corresponding to the vehicle V. The terminal corresponding to the vehicle V is, for example, the terminal 5 of the worker U who loads and unloads the storage box 31 and the storage box 32 onto the vehicle V. The terminal 5 is a smartphone or a handy terminal, for example. The terminal corresponding to the vehicle V may be a terminal of an administrator who manages the operation of the vehicle V. The terminal corresponding to the vehicle V may be mounted on the vehicle V.

The transmission controller 124 transmits, to the terminal 5, information in which the identified states of the storage box 31 and the storage box 32 are associated with the storage box IDs of the storage box 31 and the storage box 32. Specifically, the transmission controller 124 transmits storage box state information indicating the state of the storage box, which associates the [storing state] with the storage box ID [CON1] and the [empty state] with the storage box ID [CON2]. The terminal 5 displays the received storage box state information on a display part of the terminal 5. In this way, the worker U using the terminal 5 can grasp the states of the storage box 31 and the storage box 32 in the cargo bed of the vehicle V.

In addition, the transmission controller 124 may transmit the information indicating that the storage box 31 in the storing state is in the cargo bed. If the terminal 5 receives the information indicating that the storage box 31 in the storing state is in the cargo bed, the terminal 5 transmits the information indicating that the storage box 31 in the storing state is in the cargo bed. Specifically, the terminal 5 outputs audio or text information saying "there is a missed load that was supposed to be unloaded in the cargo bed of vehicle V." In this way, the worker U can grasp that there is the missed load to be unloaded in the vehicle.

The transmission controller 124 may determine whether or not the storage box 31 in the storing state in the cargo bed of the vehicle V is a load to be unloaded at the current position of the vehicle V. In this case, the storage 11 stores information associating i) the storage box ID, ii) vehicle identification information for identifying the vehicle V on which the storage box 31 indicated by the concerned storage box ID is loaded, and iii) an area within a predetermined range set as a place to unload the storage box 31 indicated by the concerned storage box ID. The predetermined range includes, for example, premises where the load is to be delivered.

When the transmission controller 124 determines whether or not to unload the load at the current position of the vehicle V, the vehicle V transmits its current position to the state identification apparatus 1. Specifically, the vehicle V includes a Global Positioning System (GPS) receiver that identifies coordinates indicating the current position of the vehicle V, and transmits the coordinates indicating the current position of the vehicle V identified by the GPS receiver in association with vehicle identification information for identifying the vehicle V. The information acquisition part 121 acquires the coordinates indicating the current position of the vehicle V and the vehicle identification information transmitted by the vehicle V.

If the current position of the vehicle V loaded with the storage box 31 indicated by the storage box ID is included within the predetermined range corresponding to the storage box ID in the storing state, the transmission controller 124 determines that the storage box 31 in the storing state is the load to be unloaded at the current position. Specifically, the transmission controller 124 determines that the storage box 31 in the storing state to be unloaded at the current position is in the cargo bed of the vehicle V, if the current position of the vehicle V corresponding to the vehicle identification information associated with the storage box ID of the storage box 31 in the storing state is included in the predetermined range associated with the storage box ID of the storage box 31 in the storing state.

If the storage box 31 in the storing state to be unloaded at the current position is in the cargo bed of the vehicle V, the transmission controller 124 transmits the information indicating that the storage box in the storing state to be unloaded at the current position is in the cargo bed. In this way, the transmission controller 124 can notify that there is a missed load to be unloaded at each delivery destination, when delivering the loads to a plurality of destinations.

If the current position of the vehicle V is outside the predetermined range, the transmission controller 124 determines that the storage box 31 in the storing state is not a load to be unloaded at the current position. In this case, the transmission controller 124 does not transmit the information indicating that the storage box 31 in the storing state is in the cargo bed.

If there is no storage box in the storing state, in other words, if all of the plurality of storage boxes are identified as having "empty" as their state, the transmission controller 124 transmits unloading completion information indicating that unloading has been completed. When the terminal 5 receives the unloading completion information, the terminal 5 outputs the information indicating that the unloading is completed. Specifically, terminal 5 outputs the audio or text information saying that the "unloading is completed." In this way, the worker U can know that there is no missed load to be unloaded and the unloading is completed.

Processing Executed by State Identification Apparatus 1

Figure 7:
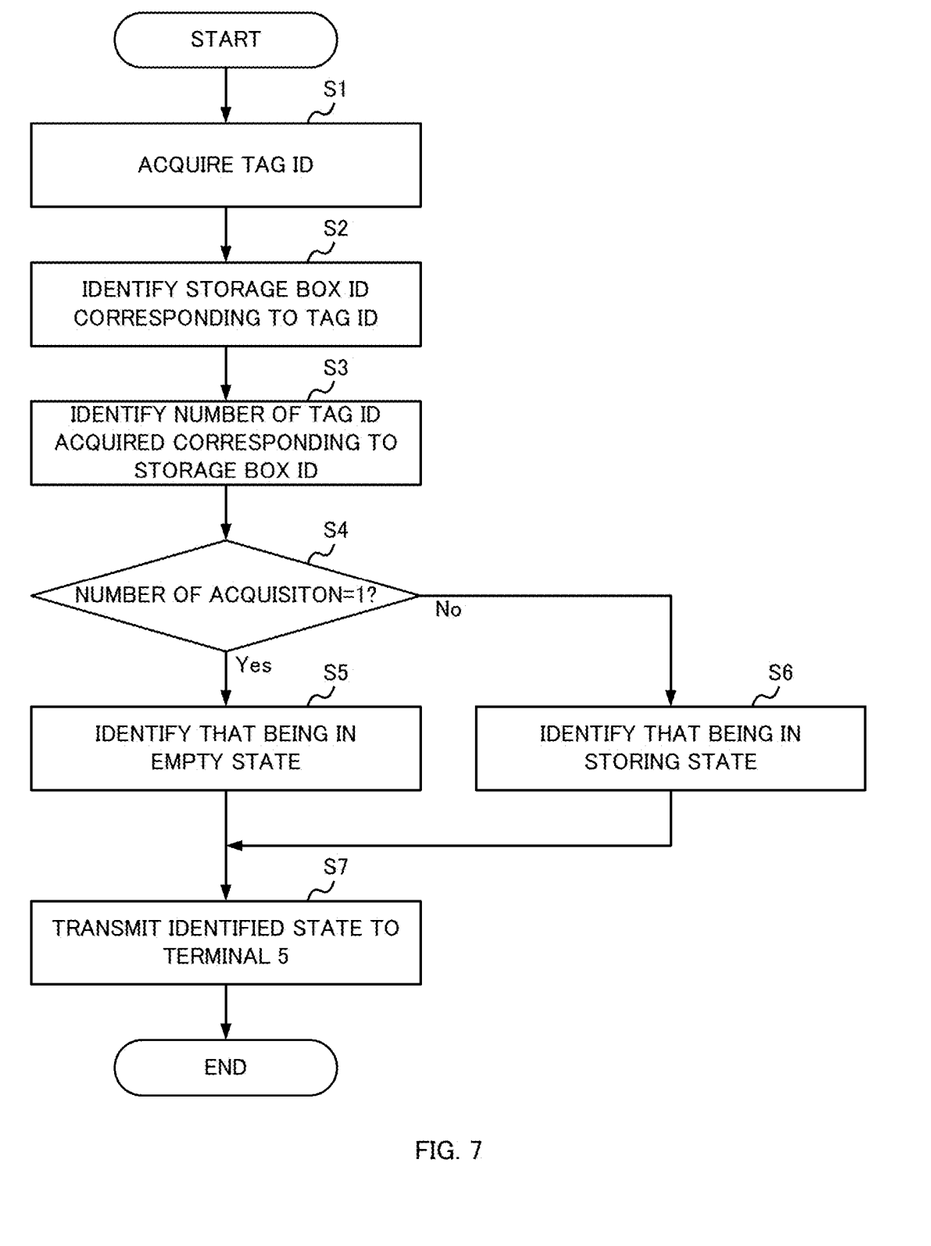
FIG. 7 is a flowchart showing an example of processing executed by a state identification apparatus.

FIG. 7 is a flowchart showing an example of processing executed by the state identification apparatus 1. First, the information acquisition part 121 acquires the tag ID of the wireless tag attached to the storage box (step S1). For example, the information acquisition part 121 acquires the tag IDs of the wireless tags attached to the storage box 31 and the storage box 32 in the cargo bed of the vehicle V via the antenna 2 installed in the vehicle V (see FIG. 1). In the example of FIG. 1, the information acquisition part 121 acquires the tag ID [ABC] of the first wireless tag 41 and the tag ID [DEF] of the second wireless tag 42 attached to the storage box 31. Further, the information acquisition part 121 acquires only the tag ID [GHI] of the wireless tag attached to the storage box 32.

Next, the number identification part 122 identifies a storage box ID corresponding to the acquired tag ID (step S2). Specifically, the number identification part 122 identifies the storage box ID corresponding to the tag ID acquired by the information acquisition part 121 by referring to the identification information management table (FIG. 5). The number identification part 122 identifies the storage box ID [CON1] corresponding to the tag ID [ABC] and the tag ID [DEF], and the storage box ID [CON2] corresponding to the tag ID [GHI].

Subsequently, the number identification part 122 identifies the number of tag IDs acquired corresponding to the storage box ID (step S3). Specifically, the number identification part 122 references the identification information management table (FIG. 5) and identifies the number of tag IDs acquired associated with the storage box ID. In the example of FIG. 1, the tag ID [ABC] and the tag ID [DEF] corresponding to the storage box ID [CON1] are acquired, and so the number identification part 122 identifies that the number of acquisitions is two. Further, only the tag ID [GHI] corresponding to the storage box ID [CON2] is acquired, and so the number identification part 122 identifies that the number of acquisitions is one.

Then, the state identification part 123 determines whether or not the number of tag IDs acquired associated with the storage box ID is one (step S4). Since the number of tag IDs acquired associated with the storage box ID [CON2] is one (Yes in step S4), the state identification part 123 references the state management table (FIG. 6) and identifies that the storage box 32 identified by the storage box ID [CON2] is in the empty state (step S5).

Since the number of tag IDs acquired associated with the storage box ID [CON1] is two (No in step S4), the state identification part 123 references the state management table (FIG. 6) and identifies that the storage box 31 identified by the storage box ID [CON1] is in the storing state (step S6).

The transmission controller 124 transmits the identified state of the storage box to the terminal 5 (step S7). Specifically, the transmission controller 124 transmits, to the terminal 5, the information associating the identified state of the storage box and the storage box ID. In the example of FIG. 1, the transmission controller 124 transmits the storage box state information indicating the state of the storage box, which associates the [storing state] with the storage box ID [CON1] and the [empty state] with the storage box ID [CON2].

Effect of Storage Box State Identification System S

As described above, the first wireless tag 41 and the second wireless tag 42 are attached to the foldable storage box 31. And, the first wireless tag 41 is disposed at a position sandwiched between the first radio wave shielding portion 61 and the second radio wave shielding portion 62 when the storage box 31 is folded. As a result, if the storage box 31 is in the empty state, the antenna 2 receives the response radio wave including the tag ID only from the second wireless tag 42. On the other hand, if the storage box 31 is in the storing state, the antenna 2 receives the response radio waves from both the attached first wireless tag 41 and second wireless tag 42. Also, if the number of tag IDs acquired is two, the state identification apparatus 1 identifies the state of the storage box 31 as the storing state. Further, if the number of tag IDs acquired is one, the state identification apparatus 1 identifies the state of the storage box 31 as the empty state.

In this way, the storage box state identification system S can identify whether the storage box 31 in the cargo bed of the vehicle V is in the storing state or the empty state. Further, the state of the storage box 31 identified by the state identification apparatus 1 can be changed simply by assembling the storage box 31 to store the load or folding the storage box 31 from which the stored load has been taken out. As a result, the worker U can change the state of the storage box 31 simply by assembling or folding it, and so no new work is required to change the state of the storage box 31, thus improving workability.

(Variation 1)

Figure 8:
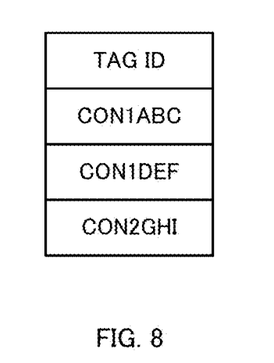
FIG. 8 is a list of tag IDs acquired if a tag ID includes a storage box ID.

In the above embodiment, the tag ID does not include the storage box ID, but the tag ID may include the storage box ID for identifying the storage box. The information acquisition part 121 acquires the tag ID including the storage box ID. FIG. 8 is a list of tag IDs acquired if the tag IDs include the storage box IDs. For example, [CON1] of the tag ID [CON1ABC] corresponds to the storage box ID.

The number identification part 122 references the list of tag IDs in FIG. 8, and identifies that the number of tag IDs acquired including the storage box ID [CON1] is two. Then, the state identification part 123 identifies that the storage box identified by the storage box ID [CON1] is in the [storing state]. The number identification part 122 identifies that the number of tag IDs including the storage box ID [CON2] is one. The state identification part 123 identifies that the storage box identified by the storage box ID [CON2] is in the [empty state].

(Variation 2)

In the above embodiment, the antenna 2 is provided in the cargo bed of the vehicle V. The present disclosure is not limited thereto, and the antenna 2 may be provided not only in the cargo bed of the vehicle V but also in the terminal 5 of the worker U, or may be provided in a portable device.

Further, the antenna 2 receives the response radio wave of the wireless tag attached to the storage box in the cargo bed of the vehicle V, but the present disclosure is not limited thereto, and the antenna 2 may also receive the response radio wave of the wireless tag attached to the storage box placed at another location. The other location is, for example, an area where the load to be carried into a warehouse is temporarily placed. In this case, the antenna 2 adjusts the output of the radio wave such that the reading radio wave reaches the area so as to transmit the reading radio wave to the wireless tag attached to the storage box in the area.

(Variation 3)

The storage box 31 may include a shutter as the radio wave shielding portion. For example, the storage box 31 includes the shutter instead of the second radio wave shielding portion 62. The shutter is made of a radio-reflective or radio-absorbent material, like the second radio shielding portion 62, and is configured to be moved left and right or up and down by the worker. The worker can sandwich the first wireless tag 41 between the first radio wave shielding portion 61 and the shutter by moving the shutter when folding the storage box.

(Variation 4)

In the above embodiment, the state is set to be the empty state if the number of acquisitions is one, and is set to be the storing state if the number of acquisitions is two. The present disclosure is not limited thereto, and the number of acquisitions associated with the state of the storage box is arbitrary. For example, the storage 11 may store the state management table in which the state is set to be the empty state if the number of acquisitions is two, and is set to be the storing state if the number of acquisitions is three. It should be noted that the wireless tag is sandwiched between the two radio wave shielding portions when the storage box is folded, and so the number of acquisitions associated with the empty state is smaller than the number of acquisitions associated with the storing state.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS

S storage box state identification system
1 state identification apparatus
10 communication part
11 storage
12 controller
121 information acquisition part
122 number identification part
123 state identification part
124 transmission controller
2 antenna
31 storage box
32 storage box
41 first wireless tag
42 second wireless tag
5 terminal
61 first radio wave shielding portion
62 second radio wave shielding portion
7 side wall
71 upper division
72 lower division
8 bottom plate
9 upper portion
U worker
V vehicle

The invention claimed is:

1. A storage box state identification system comprising:
a storage that stores an identification information management table in which a plurality of pieces of tag identification information for identifying wireless tags are associated with storage box identification information for identifying a storage box for storing a load, and a state management table in which an empty state where no load is stored in the storage box and a storing state where a load is stored in the storage box are associated with a number of pieces of the tag identification information;
an information acquisition part that acquires the tag identification information of a plurality of wireless tags via an antenna that receives a radio wave outputted from the wireless tags attached to the storage box in a cargo bed of a vehicle;
a number identification part that identifies storage box identification information corresponding to the tag identification information acquired by the information acquisition part by referencing the identification information management table, and identifies the number of pieces of tag identification information acquired corresponding to the identified storage box identification information; and
a state identification part that identifies, by referencing the state management table, whether a state of a storage box indicated by the storage box identification information corresponding to the acquired tag identification information is the empty state or the storing state on a basis of the number of acquisitions identified by the number identification part,
wherein the number of pieces of the tag identification information associated with the empty state of the state management table is less than the number of pieces of the tag identification information associated with the storing state.

2. The storage box state identification system according to claim 1, wherein the storage stores the state management table in which the empty state is associated with a state where the number of acquisitions is one, and the storing state is associated with a state where the number of acquisitions is two, and
the state identification part references the state management table, and identifies a state of the storage box indicated by the storage box identification information as the empty state if the number of acquisitions is one, and identifies a state of the storage box indicated by the storage box identification information as the storing state if the number of acquisitions is two.

3. The storage box state identification system according to claim 1, wherein
the storage box is foldable and includes:
two of the wireless tags, and
two radio wave shielding portions through which a radio wave does not pass, wherein
the two radio wave shielding portions are disposed at positions facing each other when the storage box is folded, and
any one of the two wireless tags is disposed at a position being sandwiched between the two radio wave shielding portions facing each other when the storage box is folded.

4. The storage box state identification system according to claim 3, wherein
the storage box has side walls which are folded such that an upper division thereof and a lower division thereof connected to each other overlap,
a first radio wave shielding portion of the two radio wave shielding portions is disposed to a bottom plate connected to the lower division of the storage box,
a second radio wave shielding portion of the two radio wave shielding portions is disposed at a position in the upper division facing the first radio wave shielding portion when the storage box is folded, and a first wireless tag of the two wireless tags is disposed at a position in the lower division where the first wireless wave shielding portion and the second wireless wave shielding portion sandwich an entire first wireless tag when the storage box is folded.

5. The storage box state identification system according to claim 4, wherein
a second wireless tag of the two wireless tags is disposed at a position in the lower division which is not sandwiched between the first wireless wave shielding portion and the second wireless wave shielding portion facing each other when the storage box is folded.

6. The storage box state identification system according to claim 1, further comprising:
a transmission controller that transmits the state of the storage box identified by the state identification part to a terminal corresponding to the vehicle.

7. The storage box state identification system according to claim 6, wherein
the storage stores the storage box identification information, vehicle identification information for identifying a vehicle on which the storage box indicated by the storage box identification information is loaded, and a place where the storage box indicated by the storage box identification information is to be unloaded in association with each other,
the information acquisition part acquires a current position of the vehicle on which the storage box indicated by the storage box identification information is loaded, and
the transmission controller transmits, to the terminal, information indicating that the storage box in the storing state to be unloaded at the current position is in the cargo bed of the vehicle if the current position of the vehicle is included in the place to unload associated with storage box identification information of the storage box in the storing state.

8. The storage box state identification system according to claim 6, wherein
if the states of all of the plurality of storage boxes are identified as the empty state, the transmission controller transmits unloading completion information indicating that unloading is completed to the terminal.

* * * * *